(12) United States Patent
Svensson

(10) Patent No.: US 12,231,724 B2
(45) Date of Patent: Feb. 18, 2025

(54) COMPRESSED TIMESTAMP IN A VIDEOSTREAM

(71) Applicant: VOLVO TRUCK CORPORATION, Gothenburg (SE)

(72) Inventor: Jan Svensson, Kungälv (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 112 days.

(21) Appl. No.: 18/160,654

(22) Filed: Jan. 27, 2023

(65) Prior Publication Data

US 2023/0328312 A1 Oct. 12, 2023

Related U.S. Application Data

(60) Provisional application No. 63/329,741, filed on Apr. 11, 2022.

(51) Int. Cl.
| | |
|---|---|
| *H04N 21/4402* | (2011.01) |
| *H04N 21/236* | (2011.01) |
| *H04N 21/434* | (2011.01) |
| *H04N 21/44* | (2011.01) |

(52) U.S. Cl.
CPC ... *H04N 21/4402* (2013.01); *H04N 21/23614* (2013.01); *H04N 21/4348* (2013.01); *H04N 21/44008* (2013.01)

(58) Field of Classification Search
CPC ......... H04N 21/4402; H04N 21/23614; H04N 21/4348; H04N 21/44008; B60R 1/20
See application file for complete search history.

(56) References Cited

U.S. PATENT DOCUMENTS

| | | |
|---|---|---|
| 7,545,794 B2 | 6/2009 | Loukianov |
| 8,204,081 B2 | 6/2012 | Kim et al. |
| 9,525,611 B2 | 12/2016 | Kim et al. |
| 10,142,214 B2 | 11/2018 | Kim et al. |
| 2005/0036512 A1 | 2/2005 | Loukianov |

(Continued)

FOREIGN PATENT DOCUMENTS

| | | |
|---|---|---|
| CN | 110418170 B | 11/2021 |
| JP | 2004104258 A | 4/2004 |
| JP | 2008252307 A | 10/2008 |

OTHER PUBLICATIONS

European Search Report dated Jun. 9, 2023 in corresponding European Patent Application No. 23158122.4, 7 pages.

*Primary Examiner* — Kyle M Lotfi
(74) *Attorney, Agent, or Firm* — Venable LLP; Jeffri A. Kaminski

(57) ABSTRACT

A system and method for a videostream is operating correctly. The system decompresses a compressed videostream which includes a compressed graphical timestamp, thereby resulting in a decompressed videostream with a decompressed graphical timestamp, the compressed timestamp and the decompressed graphical timestamp associated with an insert time. The system then renders the decompressed videostream, resulting in a rendered videostream with a rendered graphical timestamp. The system then extracts the rendered graphical timestamp from the rendered videostream at an extract time and determines whether a difference between the insert time of the rendered graphical timestamp and the extract time exceeds a predetermined threshold.

24 Claims, 8 Drawing Sheets

(56) References Cited

U.S. PATENT DOCUMENTS

| | | |
|---|---|---|
| 2010/0135325 A1 | 6/2010 | Kim et al. |
| 2015/0035977 A1* | 2/2015 | Schrepfer ................ H04N 5/44 |
| | | 348/143 |
| 2015/0215193 A1 | 7/2015 | Kim et al. |
| 2017/0069354 A1* | 3/2017 | Wang .................... G11B 27/34 |
| 2017/0124421 A1 | 5/2017 | Van Eeuwijk et al. |
| 2018/0376169 A1 | 12/2018 | Turmel et al. |
| 2019/0075290 A1* | 3/2019 | Dubey ................ H04N 17/002 |
| 2020/0336648 A1 | 10/2020 | Beauvillain et al. |

* cited by examiner

COMPRESSED TIMESTAMP IN A VIDEOSTREAM

CROSS-REFERENCE AND PRIORITY CLAIM

This application claims priority from U.S. Provisional Patent Application No. 63/329,741, filed Apr. 11, 2022, the entirety of which in incorporated herein by reference.

TECHNICAL FIELD

The disclosure relates generally to videostreaming. In particular aspects, the disclosure relates to a compressed timestamp in a videostream.

The disclosure can be applied in heavy-duty vehicles, such as trucks, buses, and construction equipment. Although the disclosure will be described with respect to a particular vehicle, the disclosure is not restricted to any particular vehicle.

BACKGROUND

Camera Monitoring Systems (CMS) in trucks provide many benefits over traditional mirrors. However, a failure of the CMS can have serious impact, such as if the image of a reverse camera is frozen without the driver taking notice, the driver might reverse the vehicle and hit a person suddenly appearing at the rear.

SUMMARY

In circumstances where a videostream is displaying video one may not know from moment to moment if the videostream is continuing to operate correctly, or if there is an error. For example, if a displayed videostream instead displayed a still frame of the same objects or perspective (e.g., a camera feed freezes), it may take several moments before the viewer realizes there is a problem. In circumstances where the accuracy of the videostream is relied upon, those moments can be vital. The disclosed concepts and principles can be applied to transmission of compressed video streams, such as those associated with providing traffic information, and can provide an assurance that the videostream is operating correctly.

Systems configured as disclosed herein can use compressed timestamps included in the videostream to verify that the videostream continues to operate correctly. The system analyzes the video itself, rather than metadata attached to the video, by adding the timestamps to image frames as bitmaps, then compressed and transmitted through a network. Upon decompression, the timestamp can be compared to previous or expected values. If there exists a difference between expected or previous values of the timestamp and the actual values of the decompressed timestamp, the system may pause the videostream or otherwise make the user aware that they should not rely upon the videostream.

According to a first aspect of the disclosure, a method can include:
  decompressing, via at least one processor of a computer system, a compressed videostream comprising a compressed timestamp, thereby resulting in a decompressed videostream comprising a decompressed timestamp, the compressed timestamp and the decompressed timestamp associated with an insert time; rendering, via the at least one processor, the decompressed videostream, resulting in a rendered videostream comprising the decompressed timestamp; extracting, via the at least one processor, the decompressed timestamp from the rendered videostream at an extract time; and determining, via the at least one processor, whether a difference between the insert time of the decompressed timestamp and the extract time exceeds a predetermined threshold. The first aspect of the disclosure may seek to identify if the videostream continues to operate correctly and within the thresholds required for users to safely rely upon a displayed version of the decompressed videostream. A technical benefit may include detection of errors within the videostream in a manner which relies on the image frames themselves, rather than metadata associated with the image frames.

Optionally, the compressed timestamp is sequential and incremental. A technical benefit may include reduced computational requirements as the comparison of the insert time and the extract time solely needs to determine if the sequential, incremental difference exceeds the predetermined threshold.

Optionally, the compressed graphical timestamp is a bitmap inserted into a videostream prior to compression of the videostream. A technical benefit may include reduced likelihood of a false positive error detection (compared to timestamps attached to the videostream as metadata), as the graphic is part of the videostream being verified.

Optionally, the method can further include: when the predetermined threshold is exceeded, blacking out a display receiving the rendered videostream. A technical benefit may include elimination of further reliance on the compromised videostream by the driver.

Optionally, the rendered graphical timestamp is a bitmap. A technical benefit may include faster identification of a timestamp sequence.

Optionally, the compressed graphical timestamp is a bitmap inserted into the compressed videostream after the compressed videostream was already compressed.

Optionally, the method can further include: receiving, at the computer system, a first compressed videostream; upon receiving the first compressed videostream, generating, via the at least one processor, the bitmap; compressing, via the at least one processor, the at least one processor, the bitmap, resulting in a compressed graphical timestamp; and adding, via the at least one processor, the compressed graphical timestamp to the first compressed videostream, resulting in the compressed videostream.

Optionally, the insert time comprises a predetermined cycle time between non-compressed timestamps. A technical benefit may include reduced computational requirements by using a periodic cycle time compared to a constantly increasing/sequential numbering system.

Optionally, the insert time comprises a relative time of non-compressed timestamps. A technical benefit may include reduced overall computational requirements as differences between the timestamps will be minimal when the timestamps are within the predetermined threshold.

Optionally, the method can further include: inserting, via the at least one processor, a graphical timestamp into an original videostream, resulting in a modified videostream; and compressing the modified videostream, resulting in the compressed videostream.

According to a second aspect of the disclosure, a computer system, may include: at least one processor; and a non-transitory computer-readable storage medium having instructions stored which, when executed by the at least one processor, cause the at least one processor to perform operations comprising: decompressing a compressed videostream comprising a compressed graphical timestamp, thereby resulting in a decompressed videostream comprising a decompressed graphical timestamp, the compressed graphical timestamp and the decompressed graphical timestamp associated with an insert time;

rendering the decompressed videostream, resulting in a rendered videostream comprising a rendered graphical timestamp; extracting the rendered graphical timestamp from the rendered videostream at an extract time; and determining whether a difference between the insert time of the rendered graphical timestamp and the extract time exceeds a predetermined threshold.

According to a third aspect of the disclosure, a non-transitory computer-readable storage medium having instructions stored, which, when executed by at least one processor of a computing system, cause the processor device to perform operations comprising: decompressing a compressed videostream comprising a compressed graphical timestamp, thereby resulting in a decompressed videostream comprising a decompressed graphical timestamp, the compressed graphical timestamp and the decompressed graphical timestamp associated with an insert time; rendering the decompressed videostream, resulting in a rendered videostream comprising a rendered graphical timestamp; extracting the rendered graphical timestamp from the rendered videostream at an extract time; and determining whether a difference between the insert time of the rendered graphical timestamp and the extract time exceeds a predetermined threshold.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Figure 1:
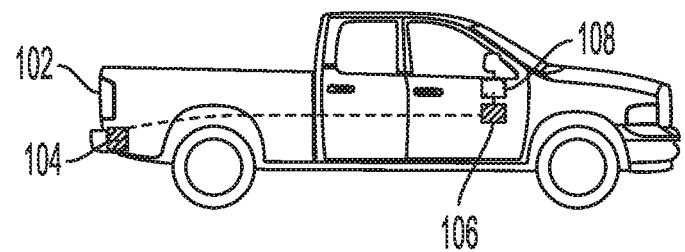
FIG. 1 is a first exemplary system configured as disclosed herein and deployed within the body of a vehicle, according to one example.

Aspects set forth below represent the necessary information to enable those skilled in the art to practice the disclosure.

Analog camera systems have been used which do not freeze or delay the video, because there is no memory that can contain an image. In such configurations, if the camera gets disconnected, the video signal is lost, and no image can be shown on the display. In addition, the display did not contain any software or digital memory that could freeze or delay the image.

There are now digital cameras and displays which are improved from analog systems (e.g., better image quality). For example, the camera can include one or more processors which convert captured light signals from the lens of the camera into the digital image. In some systems, the digital image can be transferred uncompressed over dedicated wires that are not shared, making such systems less flexible and more costly, but containing less software processing and therefore easier to analyze. Alternatively, transmission of compressed images may be preferred in circumstances where transmission bandwidth needs to be conserved. If compressed images are transmitted, a receiving processor can decompress the compressed images, at which point the receiving processor (or another processor) can render the decompressed images in preparation for display.

However, in both circumstances (compressed and/or uncompressed) one may not know from moment to moment if a camera system (including any intermediate processors) and the display are continuing to operate correctly, or if there is an error. For example, if a displayed videostream were broken and instead displayed a still frame of the same objects or perspective (e.g., a camera feed freezes), it may take several moments before the viewer realizes there is a problem. In circumstances where the accuracy of the videostream is relied upon, those moments can be vital.

Systems configured as disclosed herein can use compressed timestamps included in the videostream to verify that the videostream continues to operate correctly. To ensure that the video itself is being analyzed, rather than metadata attached to the video, the timestamps can be added to image frames as bitmaps, then compressed and transmitted through a network. Upon decompression and subsequent rendering of the image prior to display, the timestamp can be compared to previous or expected values. If there exists a difference between expected or previous values of the timestamp and the actual values of the decompressed timestamp, the system may pause the videostream or otherwise make the user aware that they should not rely upon the videostream. Preferably, comparison of the timestamp to an expected and/or previous timestamp occurs as late as possible in the image processing process, ensuring (to the extent possible) that there has not been corruption in the image transmission, compression/decompression, and rendering process. In some configurations, upon receiving the videostream from a camera the system adds a timestamp to the video stream in a graphical form (i.e., a bitmap), such that the videostream has additional graphics associated with a timestamp added to the images captured by the camera. For example, if a given frame of the video stream is captured at time "A", a bitmap timestamp of "A" is added to the frame. That updated, modified image frame is then compressed and transmitted across a network as part of a compressed videostream. The timestamp in this example is generated at the source (typically in the camera, if the camera includes a processing device).

The graphical timestamp can, for example, be formed using hexadecimal characters, typically several characters. If, for example, the first hexadecimal character is "0", a lookup table can associate "0" with a small bitmap image of a "0" which is then inserted into the image. When encoded, the encoded output for the inserted graphical timestamps is consistent, meaning that the necessary graphic details needed to distinguish graphical timestamps from one another are not lost upon encoding. That encoded sequence is then transferred to a receiver.

If corruption occurs during the encoding process, resulting in the loss of some details of the bitmap for the originally inserted graphical timestamp, then that corruption is done in a known manner such that when the graphical timestamp is decoded the resulting bitmap image will still resemble the original inserted "0" bitmap (despite some information being lost in a known manner). If no corruption occurs during the encoding, the inserted graphical timestamp provides the same graphical output is generated every time (that is, the decoded "0" bitmap will always decode the same way, the decoded "1" bitmap will always decode the same way, etc., for all inserted bitmaps). To simplify the identification of a decoded bitmap to known insertion bitmaps, a lookup table can be used. Note that while examples provided herein include bitmaps of hexadecimal "0-F" characters, alphanumeric characters, etc., the bitmaps for graphical timestamps can be any representation of time units that can be put in a sequence and differ from each other (e.g., different colors in the color spectrum, other alphanumeric characters, in longer or shorter sequences as needed).

Upon being received by a computer system, the compressed videostream is then decompressed and rendered, and the graphical timestamp (a bitmap) is extracted from the rendered videostream. The system can then compare that graphical timestamp to an expected timestamp, or to previous timestamps extracted from the videostream, to ensure that the videostream is operating correctly.

Consider the following example. A vehicle (e.g., a car, a truck, a boat, etc.) is backing up and the driver is relying on the videostream from the backup camera displayed on the vehicle's dashboard to ensure the vehicle does not collide with any objects. If the videostream were to freeze and the vehicle's driver were unaware that the camera had stopped working, the vehicle may be damaged or the vehicle may unintentionally collide with someone/something. The vehicle, configured as disclosed herein, has a processor or computer system to receive the videostream produced by the camera. That processor then adds, to individual frames within that videostream, graphical timestamps indicating when the videostream was received. The graphical timestamp can be, for example, a series of bitmaps, such as 0x00000001 (where each character is a different bitmap inserted into the videostream) (please note that the number of bitmaps can vary between configurations, such that in some configurations there are more bitmaps and in other configurations there are fewer bitmaps). In other configurations, the graphical timestamp can be one or more bitmaps capturing a letter or letters, symbols, or other representation of time.

The insert time, which corresponds to when the videostream was captured, is represented by the inserted graphical timestamp. In some configurations, such as those where the insert time is a series of bits, the insert time can increase sequentially periodically while the camera continues to capture new video, such that every cycle or period the series of bits increases by one. Upon reaching a "full" value, such as 0x11111111, the subsequent value can revert to 0x00000000. Exemplary, non-limiting periods can include every second, every tenth of a second, and every half second. In some configurations (i.e., where the cycle of bits is not synchronized with the actual/current time), the graphical timestamp may later be used for comparison against a known or expected timestamp. In other configurations (i.e., where the cycle of bits is synchronized with the actual/current time), the graphical timestamp may later be used for comparison against a known or expected timestamp, as well as to determine if the time since the videostream was captured exceeds a predetermined amount of time.

The timestamp can vary in complexity. For example, in some configurations the graphical timestamp may only count from zero to nine (i.e., 0-9) with ten different associated bitmaps, or may only count from zero to N (i.e., 0-N, N being a predetermined number), with n different patterns (n corresponding to the current count) inserted into one single location in the frame. In yet another example, the system may be using a hexadecimal counter where four characters are counting 0 to 0xFFFF, and the associated bitmaps are inserted at four locations within each frame, one for each hexadecimal character.

The time value representing the time when the videostream was captured can be converted into one or more bitmaps using a look up table. For example, the system can identify specific bitmaps to insert into the frames of the videostream based on the time value. The available bitmaps can be graphical representations of the time value itself, such that in certain configurations the graphics added to the individual frames of the videostream are bitmaps of hexadecimal, alphanumeric, or other characters representing the time value (such as other abbreviated forms of the timestamp). In other configurations, the graphics added can be any bitmap that is sufficiently unique between the corresponding timestamps. For example, in some configurations, the added graphics may be a finite set of rectangles across a visual spectrum. Preferably, the graphics associated with the timestamp are added to the videostream as additional video content, rather than overwriting or replacing captured video content.

Continuing with the example of the vehicle backing up, while the camera continues to capture video content, the computer system is generating the time values and inserting associated graphical timestamps corresponding to those time values (i.e., the insert time) into the video frames of the video content, resulting in a modified videostream having the time value information in the form of graphical timestamps. That modified videostream is then compressed and transmitted across a network within the vehicle to another processor which decompresses the compressed videostream. At that point the graphical timestamp previously added to the video frames is extracted (at an extract time) from the decompressed and rendered videostream. The extract time is then compared to the insert time captured by the graphical timestamp. If the difference between the extract time and the insert time exceeds a threshold amount of time, the system can determine that an error has occurred and turn off the videostream feed being displayed, such that the vehicle driver does not erroneously rely on the compromised feed. If the difference between the extract time and the insert time does not exceed the threshold amount of time, the system can continue displaying the decompressed videostream on the dashboard of the vehicle. Preferably, the graphical timestamps which were added to the videostream prior to compression, decompression, and rendering are cropped out of the displayed videostream.

In certain aspects, camera systems used by systems configured as disclosed herein can include a software system distributed on several processing units, and may include a camera, switches, electronic control unit (ECU), display, etc. In some configurations, the camera can have a built in processor which performs one or more of capturing images (i.e., video frames), inserting the graphical timestamp into the images (the graphical timestamp capturing the when the image was recorded, i.e., the insert time), compressing the modified images, and transmitting the compressed, modified images to another processor. The receiving processor(s) can then decompress the compressed, modified images; render the images for display; extract the added graphical timestamps from the rendered images; and perform a comparison of the extract time to the insert time prior to allowing the rendered images to be displayed. The software system may be layered from communication stacks to applications. Communication (e.g., ethernet based) and digital compressed streaming video can contain complexity, buffers, and/or processing steps where the video image could get stuck or delayed which are failure modes that can cause a hazardous situation.

The disclosure provides a system and method to ensure that the integrity of the videostream is not compromised, and/or that the image is not delayed or frozen on the path to the display, particularly display systems where Linux, Android, or other commonly available operating systems are used and/or where the full software is not qualified for use in safety applications.

The processing of video (such as that from a rear-view camera) and sending the video to a display is only one of many tasks for an ECU. For example, the ECU can handle entertainment functions (e.g., radio) as well as productivity applications (e.g., fleet management, map navigation, etc.). For such ECU's, a common architectural pattern is to have a two processor solution, where the vehicle connectivity is handled by one processor, and the applications and user interactions are handled by a processor including high performance graphical processing (e.g., video processing).

Systems configured as disclosed herein can integrate video into the display while coexisting with other views provided by the ECU. Moreover, systems configured as disclosed herein provide increased safety in parallel with other applications (e.g., a music player). In particular, the system and method reduces and isolates the functionality that needs to be developed according to functional safety standards.

For an Ethernet based system (although others may be used), there are, within the scope of this disclosure, at least two solutions to processing and displaying video. First, the full image processing pipeline (the path of receiving, processing, and outputting data to the display) can be developed using a safety certified operating system (OS) software components involved in the processing are developed according to a chosen safety standard. Alternatively, a non-certified OS and software components can be used for the image pipeline, and the processing can be monitored by an independent functionality (e.g., a supervisor processing device).

In some configurations, the system can include a supervisor. The supervisor is a second processor, or a separate thread within a single processor, which reviews the graphical timestamps and can initiate a hold or reset on the camara system if an error is detected. The supervisor may be running independently from the image pipeline, may be developed according to the chosen safety standard, and/or may use commonly available components residing in the (a safety certified OS). To create a safe system, the supervisor may monitor the appropriate data (have sufficient coverage of detecting faults) and be able to act based on that data.

In some configurations, the system can include a receiver path. Within the receiver path, the videostream is received by the system as a compressed stream of digital bits. Preferably, that stream of bits is not corrupted or delayed while being received and unpacked. However, if there is an error in the stream of bits (due to corruption or delay), the system as disclosed herein can detect that error and halt the videostream. The videostream protocol may, for example, be RTP (Real-time Transport Protocol) over IP (Internet Protocol) above the Ethernet layer. Each image frame can include a number of RTP frames.

In some configurations the system can include decompressing a compressed videostream. The full image (e.g., a video frame) received as part of the videostream can be decoded (uncompressed). This process may be done without corruption or delays. The stream may, for example, be compressed by H.264 coding or any other encoding or compression algorithm known to those of skill in the art.

In some configurations the system can include rendering the decompressed videostream. The rendered image can then be input to an image buffer where the video generation circuits produce the video signal for the display. This process may be done without corruption or delays.

The decoding and rendering above can be monitored by a probe inserted in the output path to the display. This probe is a capability that could be found in some processors that target safety critical applications.

The receiver path integrity and delay can be monitored by forwarding the first RTP frame of each image frame to the supervisor. That frame can be protected by a CRC (Cyclic Redundancy Check), so any corruption will be detected. Also the RTP timestamp can be stored for later comparison.

The decoding and rendering may be checked for correct behavior by inserting a known bit pattern that can be decoded together with the compressed image data (e.g., a known input gives a known output). The bit pattern used as input is the timestamp from the RTP frame.

The probe can be configured to look at the inserted decoded bit pattern. The time from the bit pattern can be compared with the stored RTP timestamp in the supervisor and check that the image is not delayed.

Additional probes can be set up to check for that the image is not frozen, etc.

When a graphic timestamp is inserted into the videostream, the graphic timestamp can be formatted such that it fits into one or several segments of the videostream, where each segment will represent a certain part of the decompressed image. For example, a segment could be a 16×16 pixel square, and can be inserted into known locations of the videostream where needed details will not be lost during the compression/decompression processes.

In some configurations the graphic timestamp can be inserted into a video frame/image such that it replaces the first segment(s) of the videostream for each image. For example, if the first segment where a block of 16×16 pixels at the top left of the image, the graphic timestamp could replace the original imagery captured with the timestamp graphic. In other configurations, the graphic timestamp can be added (as additional content) to the videostream for each image, (e.g., adding additional pixels to the captured imagery) such that the first segment(s) of that modified image correspond to the graphical timestamp or to other added graphics.

In configurations where the inserted time stamp graphic is not cropped out of the displayed image, dark colors for the inserted time stamp can be chosen to minimize visibility.

Decoding the graphical timestamp allows the system to retrieve the insert time information associated with a given image, video frame, or other portion of a video stream (i.e., the time when the image, video frame, or other portion was captured).

In some configurations the timestamp can be retrieved by looking at a signature (e.g., a CRC (Cyclic Redundancy Check), or other information which can be used to verify the authenticity of the data) of the segment(s) (rather than looking at the raw bit information). Still, if known information is inserted as a graphic timestamp, there will be a signature matching the graphic timestamp, so in some configurations it is possible to use a lookup in a predefined table for matching graphic timestamps to corresponding characters.

A benefit of using a lookup table is that it is quick, and does not rely on a unique decoder to decompress the videostream and compare extracted graphic timestamps to expected or known graphic timestamps (which can be done with a supervisor). While the supervisor can execute independently in a separate execution environment, often with much fewer resources, a lookup table can be generated off-line once, use the same decoder to decompress the compressed videostream, and quickly compare the extracted graphic timestamp to the known graphic timestamp.

In configurations using a supervisor, the supervisor can monitor the execution in the decoding and rendering phases, comparing the extract time from the insertion time, and if the extract time differs from the insertion time by more than an acceptable amount determining that execution is too slow. If the extract time is significantly (beyond a predetermined threshold) distinct from the insertion time, or there are no matching entries in the lookup table, then some part of the system execution is corrupted. In such instances the supervisor can take action to prevent further reliance on the displayed videostream, such as blanking the image on the display.

The supervisor sub-system (e.g., a monitor-actuator) can cover possible faults. Where the image pipeline can be considered untrusted, the supervisor can be considered trusted. Any faults that may violate safety goals can be monitored by the supervisor sub-system. The supervisor may be independent from the image pipeline, meaning that the process of preparing the modified videostream, compressing the videostream, decompressing the compressed videostream, and rendering the decompressed videostream are unaffected by the supervisor.

These concepts and principles will be further expanded upon with respect to the specific examples provided in the figures.

FIG. 1 is a first exemplary system configured as disclosed herein and deployed within the body of a vehicle, according to one example. In this example, the vehicle has a backup camera 102 capturing video and a first processor 104 capable of inserting graphical timestamps into the videostream captured by the backup camera 102. In some configurations, the first processor 104 can be part of the backup camera 102, converting the sensor image into a digital image, whereas in other configurations the first processor 104 can be separate from the camera 102. Once the first processor has modified the videostream to contain graphical timestamp, the modified videostream is compressed and transmitted to a second processor which is part of the ECU 106. The transmission from the first processor 104 to the second processor/ECU 106 can be across dedicated wires within the vehicle, or the transmission can be across a network (wired or wireless). Once the compressed videostream is received by the second processor/ECU 106, the compressed videostream is decompressed and rendered, and the graphical timestamp within the video stream is extracted at an extract time. The extract time is then compared to an insertion time identified by the graphical timestamp (i.e., when the graphical timestamp was inserted into the videostream). In some configurations the first processor 104 can transmit, separate from the modified, compressed videostream, the time value captured by the graphical timestamp (which was added to the videostream) to the second processor/ECU 106, allowing the second processor/ECU 106 to determine if the decompressed, rendered video stream matches the expected videostream, and if the match was received within a predetermined time period.

If the comparison indicates that the video system (e.g., the camera 102, the first processor 104, the second processor/ECU 106, the transmission) is operating correctly, the second processor will send at least a portion of the rendered videostream to a display 108, allowing the driver of the vehicle to rely on the videostream. If, however, the comparison indicates that the video system is not operating correctly, the system can turn off the display 108, blacken the display 108, or otherwise inhibit the rendered version of the decompressed videostream from being displayed on the display 108.

Figure 2:
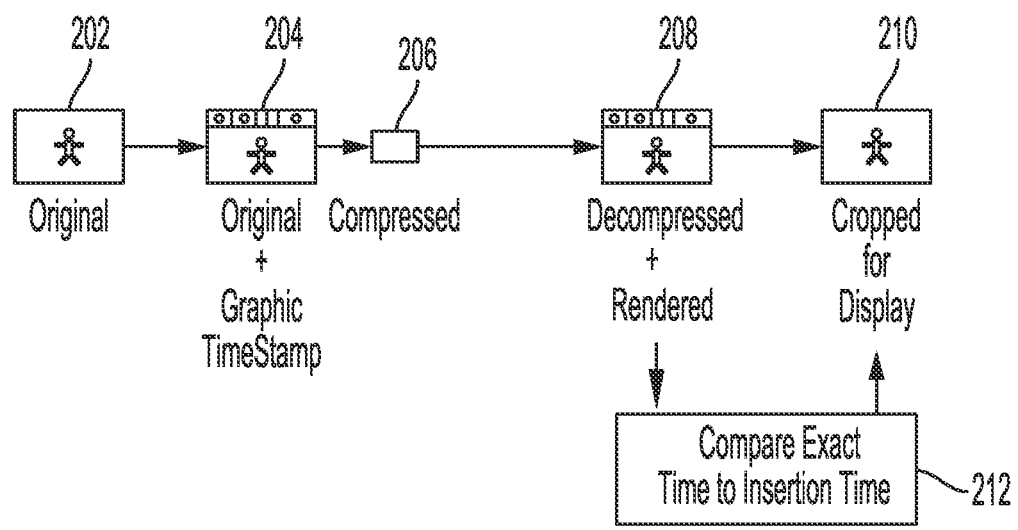
FIG. 2 is an exemplary process view of video being captured, compressed, decompressed, and cropped for display, according to one example.

FIG. 2 is an exemplary process view of video being captured, compressed, decompressed, and cropped for display, according to one example. As illustrated, an original image 202 is captured. This original image 202 can, for example, be part of a videostream. In some configurations, the original image 202 can form, for example, an image frame of the videostream, whereas in other configurations the original image 202 is only a portion of the image frame. The system adds a graphic timestamp to the original image 202, resulting in the original image with a graphic timestamp 204. The graphic timestamp can be additional pixels added to the overall image, or the graphic timestamp can replace pixels of the original image. The modified image 204 containing both the original image and the graphic timestamp is then compressed 206 and transmitted to another processor. Upon being decompressed and rendered 208, the system can compare the insertion time captured within the graphic timestamp to an extract time 212 when the graphic timestamp was captured from the decompressed, rendered videostream 208. In other configurations, where the insertion time is not directly available from the graphic timestamp, the system can, for example, compare the extracted graphic timestamp against a known graphic timestamp, allowing the system to determine if there are errors in the video compression/transmission/decompression process. Once the system determines that the videostream meets the required thresholds regarding video quality (e.g., based on a comparison of extract time to insertion time, or based on graphic timestamp comparisons), the system may display the videostream on a display. Preferably, the videostream is cropped for display 210, such that the graphic timestamp is not displayed.

Figure 3:
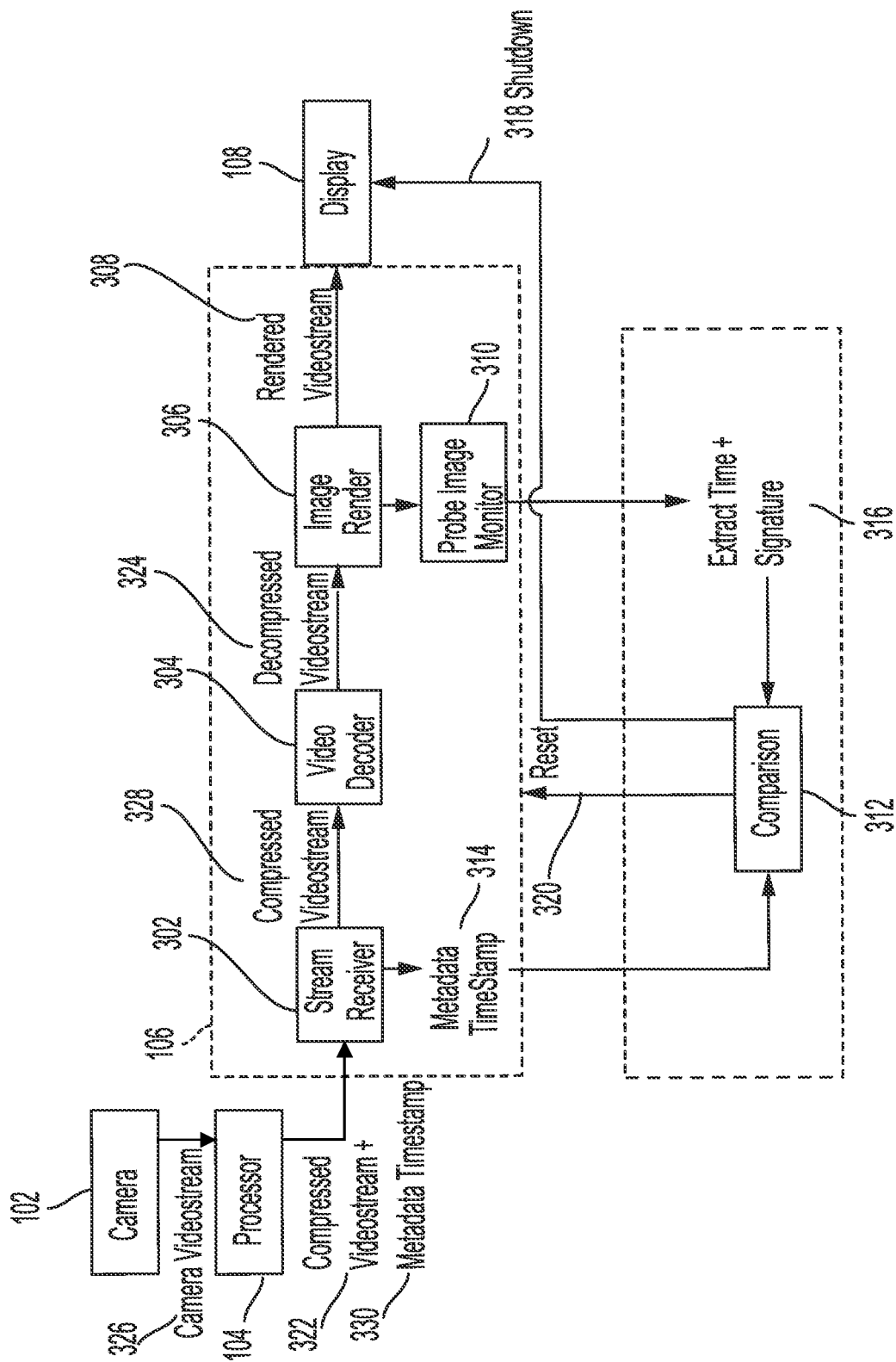
FIG. 3 is a second exemplary system configured as disclosed herein, according to one example.

FIG. 3 is a second exemplary system configured as disclosed herein, according to one example. In this example, the system obtains information about the decompressed videostream 324 (i.e., a signature of the graphic timestamp which was embedded within the videostream and/or an extract time of when the graphic timestamp was removed from the videostream 316), compares 312 that information against a metadata timestamp 314 accompanying the videostream, and if the comparison 312 reveals that the information does not match (or is not within a threshold range), the system can be reset 320 or shutdown 318.

In this example, the camera videostream 326 leaves the camera 102 and is received by a processor 104. At the processor 104, a graphic timestamp (a bitmap) is inserted into the camera videostream 326. With the insertion of the graphic timestamp, the processor 104 then compresses the modified camera videostream, resulting in a compressed videostream 322. This insertion of the graphic timestamp into the camera videostream 326 is done at an insert time.

All time associated with the camera 102 and the processor 104 is kept in a "local sender time." To relate the ECU 106 to the local sender time, two options are presented. Option 1, which is illustrated, is to transmit the insert time with the compressed videostream 322 as a metadata timestamp 330. This transmission of the metadata timestamp 330 from the processor to the ECU 106 could, for example, be done using an RTP protocol. Option 2, which is not illustrated, is to add a time syncronisation protocol, e.g., PTP (Precision Time Protocol), to keep the ECU 106 and the processor 104 clocks in synconization.

The compressed videostream 322 and the metadata timestamp 330 transmitted from the processor 104 is received by the ECU 106 at a stream receiver 302, which receives and unpacks the stream of data being transmitted from the receiver 104. In some configurations, the stream receiver 302 may not be present, and the data within the stream can be routed as necessary. The now received compressed videostream 328 is forwarded to a video decoder 304, which decompresses the compressed videostream 328 (including the previously inserted graphic timestamp), producing a decompressed videostream 324 (which still includes the graphic timestamp).

The decompressed videostream 324 can be rendered by an image render 306 process, where the decompressed videostream 324 is prepared for display (e.g., combined with other information, graphics, text, etc., resulting in a rendered videostream 308 which is forwarded to a display 108. In some configurations, the image render 306 may update or modify the format of the data within the decompressed videostream 324 in order to prepare the data for display on the display 108.

The probe image monitor 310 monitors a specific area of the rendered videostream 308 (e.g., specific pixels or portions of the rendered videostream 308) where the graphic timestamp is located. Upon finding the graphic timestamp which was previously inserted into the videostream by the processor 104, the probe image monitor 310 generates a signature based on the graphic timestamp. One way of creating a signature is a CRC (Cyclic Redundancy Check) or a hash value from the bitmap of the graphic timestamp. The signature is generated at an extract time. The extract time and the signature 316 are output from the probe image monitor 310.

The metadata timestamp 314, unpacked from the data stream by the stream receiver 302, can be compared 312 to the extract time and/or the signature 316. In some configurations, this comparison 312 can be performed by a separate control unit (e.g., a supervisor), whereas in other configurations the comparison 312 can occur within the ECU 106. The comparison of the metadata timestamp 314 to the extract time and signature 316 can be a multistage process. First, the signature can be converted, using a lookup table, into a lookup timestamp. That is, the CRC or hash value generated from the bitmap of the graphical timestamp can be converted into a timestamp (the "lookup timestamp"). When the lookup timestamp matches the metadata timestamp 314, the next stage of the comparison process begins. At that point, the extract time (when the signature was generated) can be compared against the insert time indicated by the metadata timestamp 314. If the time difference between the insert time and the extract time is beyond an acceptable threshold, a reset 320 can be initiated of the display 108 and/or the ECU 106, or similarly a shutdown 318. Likewise, if the metadata timestamp 314 is not plausible, the reset 320 can be initiated. For example, if there is a drift between the clocks of the processor 104 and the ECU 106, it may result in a large time discrepancy which would not be plausible.

Figure 4:
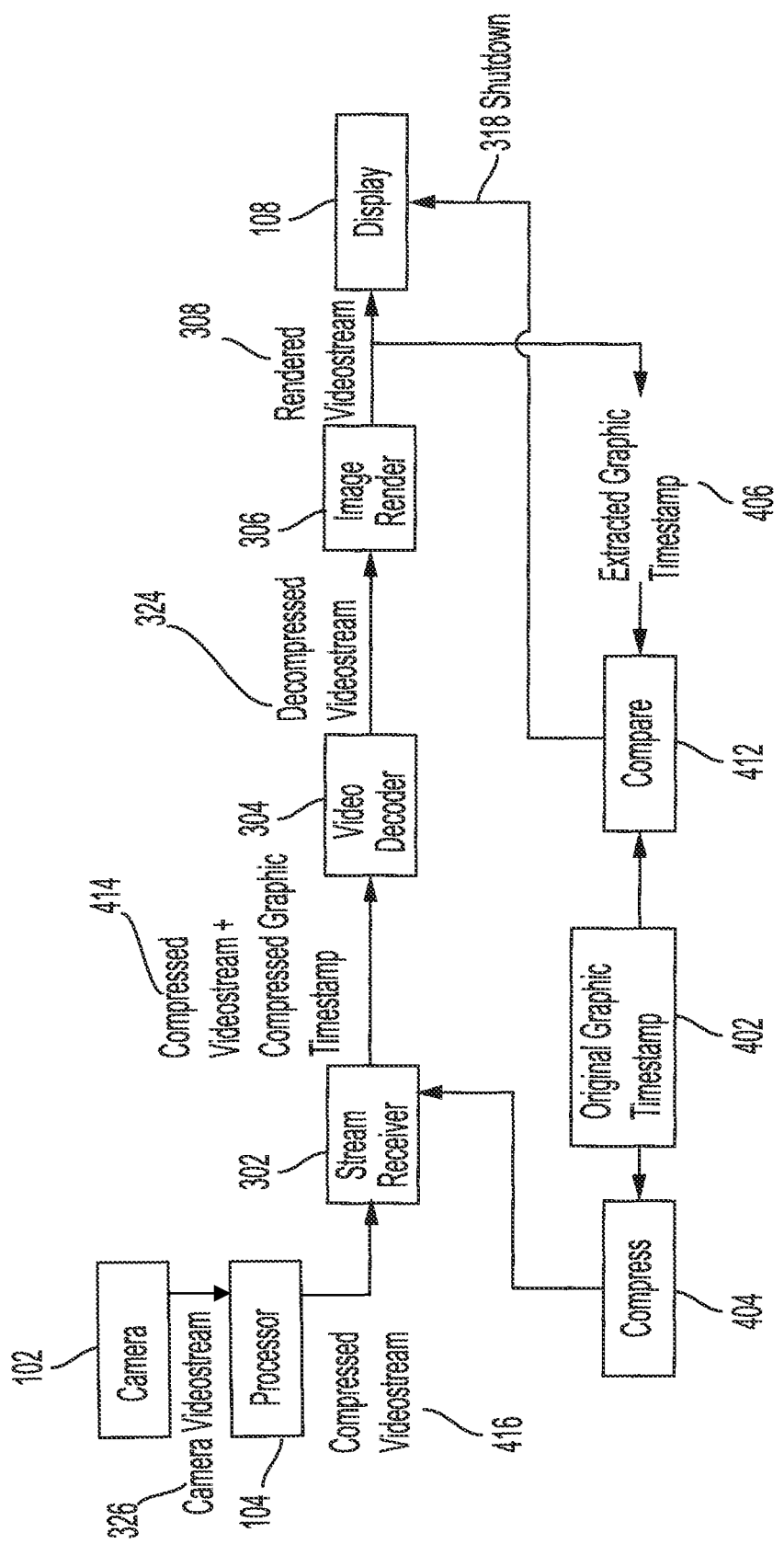
FIG. 4 is a third exemplary system configured as disclosed herein, according to one example.

FIG. 4 is a third exemplary system configured as disclosed herein, according to one example. This example is used to confirm that the received stream of data (i.e., the compressed videostream 416) from the camera 102 and processor 104 is being processed occurring properly. Similar to FIG. 3, the camera 102 produces a camera videostream 326, which is compressed by the processor 104 into the compressed videostream 416. However, in this example, when the compressed videostream 416 is received by the stream receiver 302, the compressed videostream 416 does not contain an inserted graphic timestamp. Instead, the system (upon receiving the compressed videostream 416) generates an original graphic timestamp 402, compresses 404 that original graphic timestamp, and combines it with the compressed videostream, resulting in a compressed videostream and a compressed graphic timestamp 414.

The video decoder 304 receives the compressed videostream and compresed graphic timestamp 414, resulting in a decompressed videostream 324 which contains the (now inserted) original graphic timestamp 402. The decompressed videostream 324 is then rendered 306 in preparation for display on the display 108. The rendered videostream 308 is provided to the display 108, and the system extracts the (previously inserted) graphic timestamp 406 from the rendered videostream 308. The extracted graphic timestamp 406 is then compared 412 against the original graphic timestamp 402 generated. If the comparison 412 determines that the extracted graphic timestamp 406 does not match the original graphic timestamp 402, the system can shutdown 418 the display 108.

Figure 5:
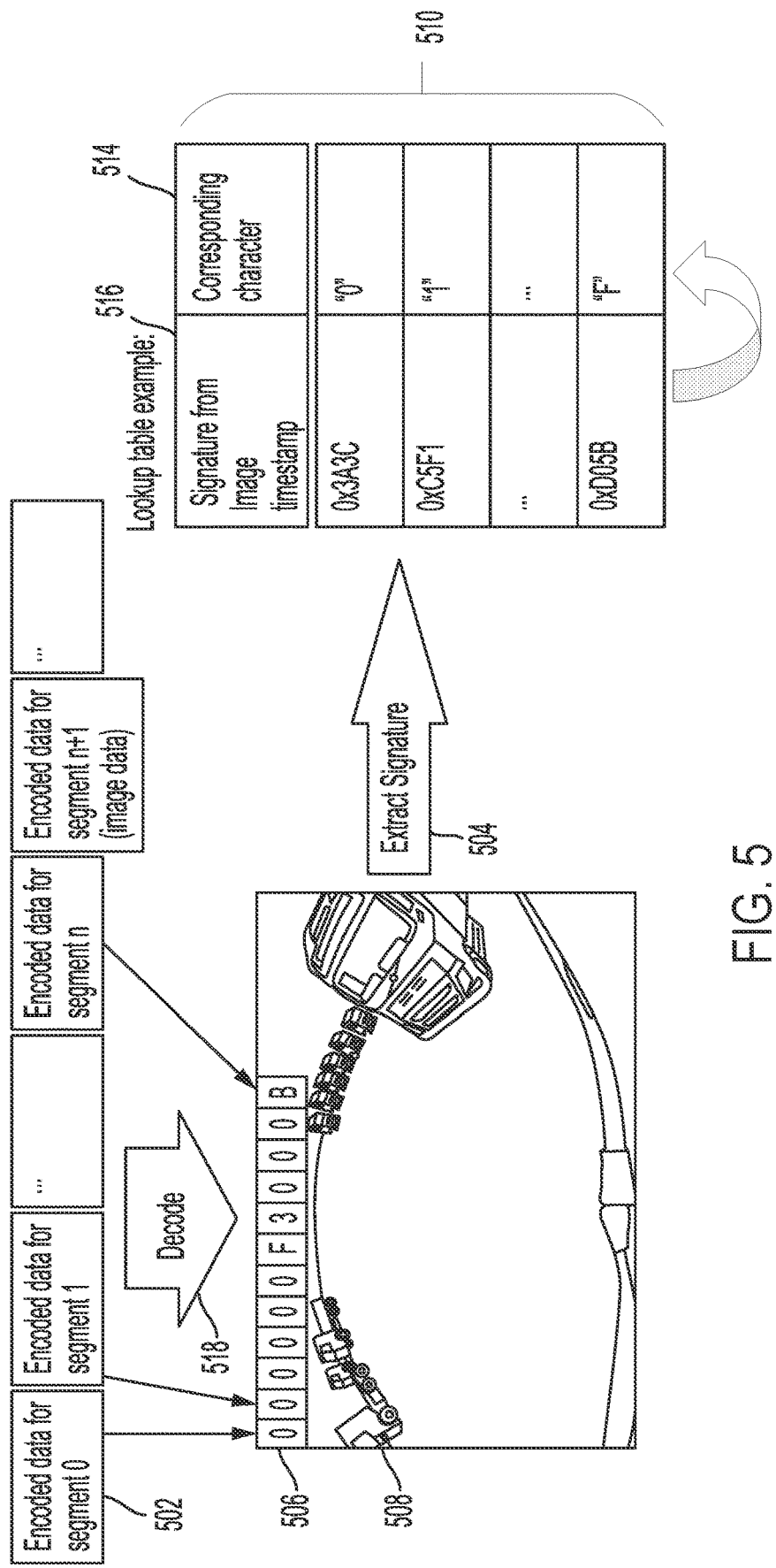
FIG. 5 is an exemplary view of an original timestamp retrieval process, according to one example.

In some instances, the graphic timestamp after decompression does not match (e.g., bit for bit) the graphic timestamp inserted before compression. Because both compression and decompression is deterministic, a lookup table can retrieve the original timestamp from the decompressed image timestamp. FIG. 5 is an example of that retrieval process.

In this example, the system receives encoded (compressed) data 502 associated with an image stream, the encoded data 502 having multiple segments (e.g., segment 0, segment 1, . . . , segment n, segment n+1). The system decodes 518 (i.e., decompresses) the encoded data 502, thereby also decompressing the compressed graphical timestamp 506, that in this example is forming graphical characters, with each segment in the graphical timestamp 506 being a bitmap of a single character.

First, the signature 516 (generated from the bitmap which forms the graphical timestamp 506) is extracted 504 from the videostream 508. The signature 516 is made up of segment signatures, each corresponding to a single illustrated character within the image timestamp 506. Moving left to right in the illustrated example lookup table 510, each valid segment signature (e.g., "0x3A3C", "0xC5F1", etc.) within the signature 516 has a corresponding character 514 (e.g., "0", "1", etc.).

Based on the character 514, the system can then use the lookup table 510 to identify the original bit sequence 512. The system can have information indicating how many segments ("n") will correspond to the graphic timestamp 506, such that the system only retrieves and attempts to decode segments which are part of the graphic timestamp 506 (rather than other portions of the videostream 508 which are not the graphic timestamp 506). Illustrated are n=twelve graphics 506 added to the videostream 508—these are images which correspond to the first encoded segments 502 (twelve is purely exemplary, the number of values can vary according to need). When the system extracts the graphic timestamps 506, the system sequentially extracts the bitmaps of each graphic timestamp 506, then uses the lookup table 510 to identify the corresponding character 514 and the characters from each segment together form the complete timestamp.

Figure 6:
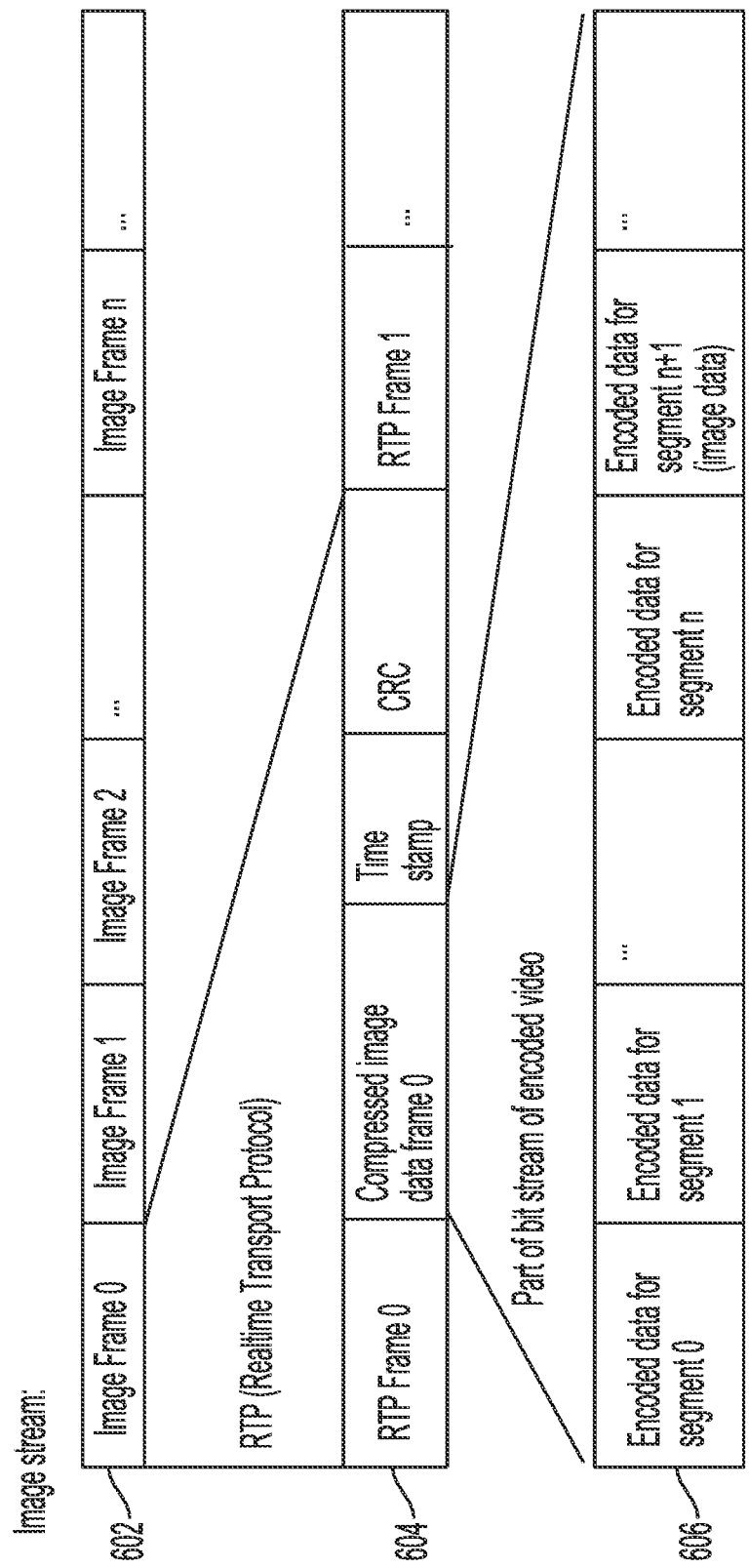
FIG. 6 is an exemplary view of an image stream, according to one example.

FIG. 6 is an exemplary view of an image stream, according to one example. In this example, the videostream 602 has multiple image frames. Each image frame can be transported by RTP which contains: a frame identifier, compressed image data, a time stamp, and CRC information. Each image frame contains multiple RTP frames 604. Within the compressed image data are encoded segments 606, where encoded segments corresponding to parts of the timestamp are found. Following the encoded segments corresponding to the parts of the timestamp is found encoded image data (illustrated as encoded data for segment n+1).

Figure 7:
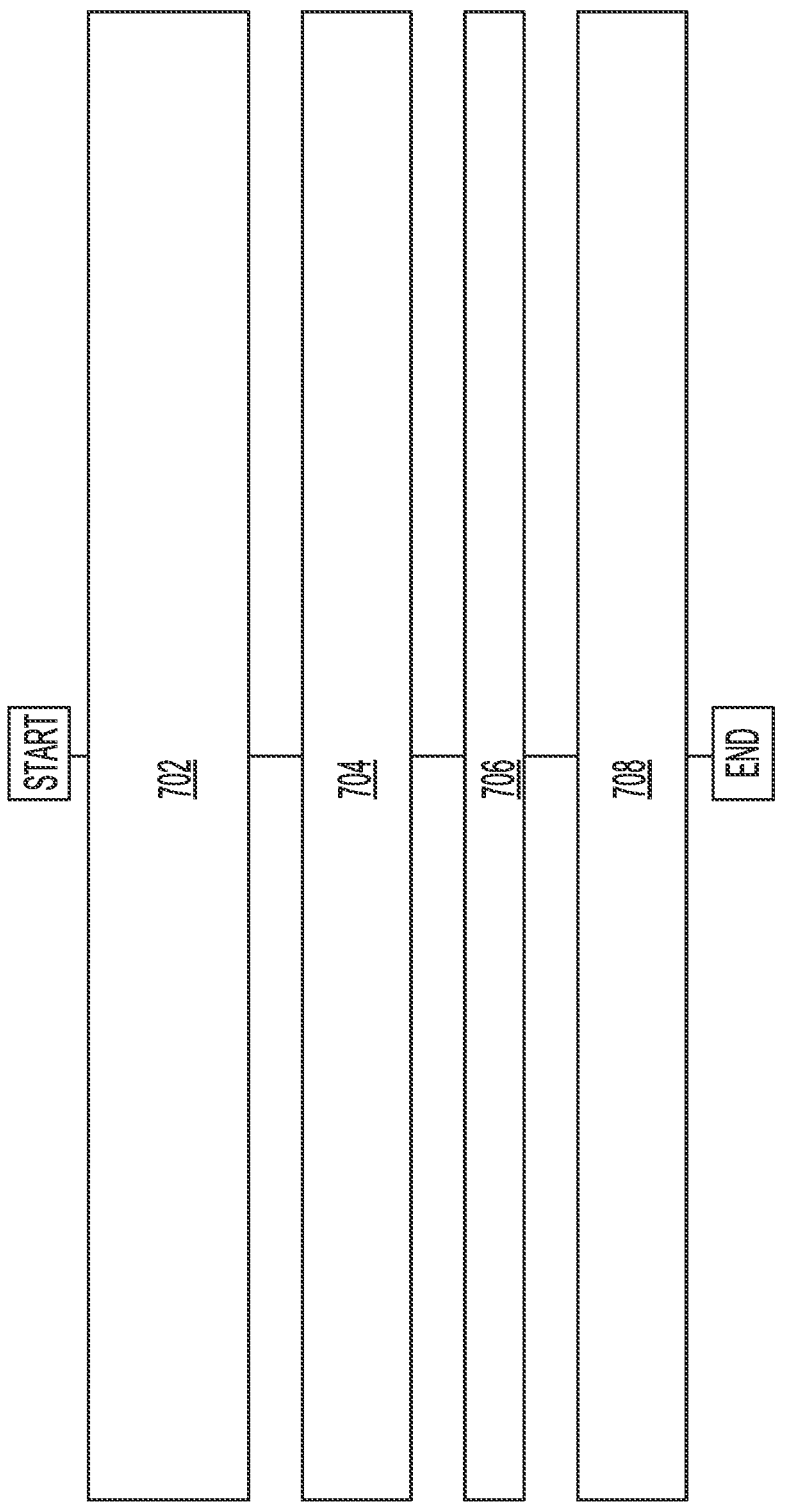
FIG. 7 is an exemplary method which can be performed as disclosed herein, according to one example.

FIG. 7 is an exemplary method which can be performed as disclosed herein, according to one example. As illustrated, the method can include: decompressing, via at least one processor of a computer system, a compressed videostream comprising a compressed graphical timestamp, thereby resulting in a decompressed videostream comprising a decompressed graphical timestamp, the compressed timestamp and the decompressed timestamp associated with an insert time (702). The method can continue by rendering, via the at least one processor, the decompressed videostream, resulting in a rendered videostream comprising a rendered graphical timestamp (704), and extracting, via the at least one processor, the rendered graphical timestamp from the rendered videostream at an extract time (706). The method can then include determining, via the at least one processor, whether a difference between the insert time and the extract time exceeds a predetermined threshold (708). For example, the determining can include matching the decompressed graphical timestamp with the insert time, then checking the difference between the extract time and insert time.

In some configurations, the compressed graphical timestamp can be sequential and incremental.

In some configurations, the compressed graphical timestamp can be a bitmap inserted into a videostream prior to compression.

In some configurations, the illustrated method can further include: when the predetermined threshold is exceeded, blacking out a display receiving the rendered videostream.

In some configurations, the illustrated method can further include: identifying the decompressed graphical timestamp from a bitmap using a lookup table. In such configurations, the method can also include: upon determining that the decompressed graphical timestamp does not match the expected decompressed graphical timestamp, blacking out a display receiving the rendered videostream.

In some configurations, the illustrated method can further include: receiving, at the computing device, after rendering, a non-compressed graphical timestamp at the extract time, the non-compressed graphical timestamp corresponding to the extract time, wherein the determining, via the at least one processor, whether the difference between the insert time of the decompressed graphical timestamp and the extract time exceeds the predetermined threshold further comprises: determining whether the difference between the insert time of the decompressed graphical timestamp and the extract time of the non-compressed graphical timestamp exceeds the predetermined threshold. A non-limiting example of the determining process can include matching the decompressed graphical timestamp with the insert time, then checking the difference between the extract time and insert time.

In some configurations the insert time can include a predetermined cycle time between non-compressed graphical timestamps.

In some configurations the insert time can include a relative time of non-compressed graphical timestamps.

In some configurations, the illustrated method can further include: inserting, via the at least one processor, a graphical timestamp into an original videostream, resulting in a modified videostream; and compressing the modified videostream, resulting in the compressed videostream.

In some configurations, the illustrated method can further include: receiving, at the computing device, the compressed videostream including the compressed graphical timestamp.

In some configurations, the illustrated method can further include: receiving, at the computing device from a camera, the compressed videostream and the insert time.

Figure 8:
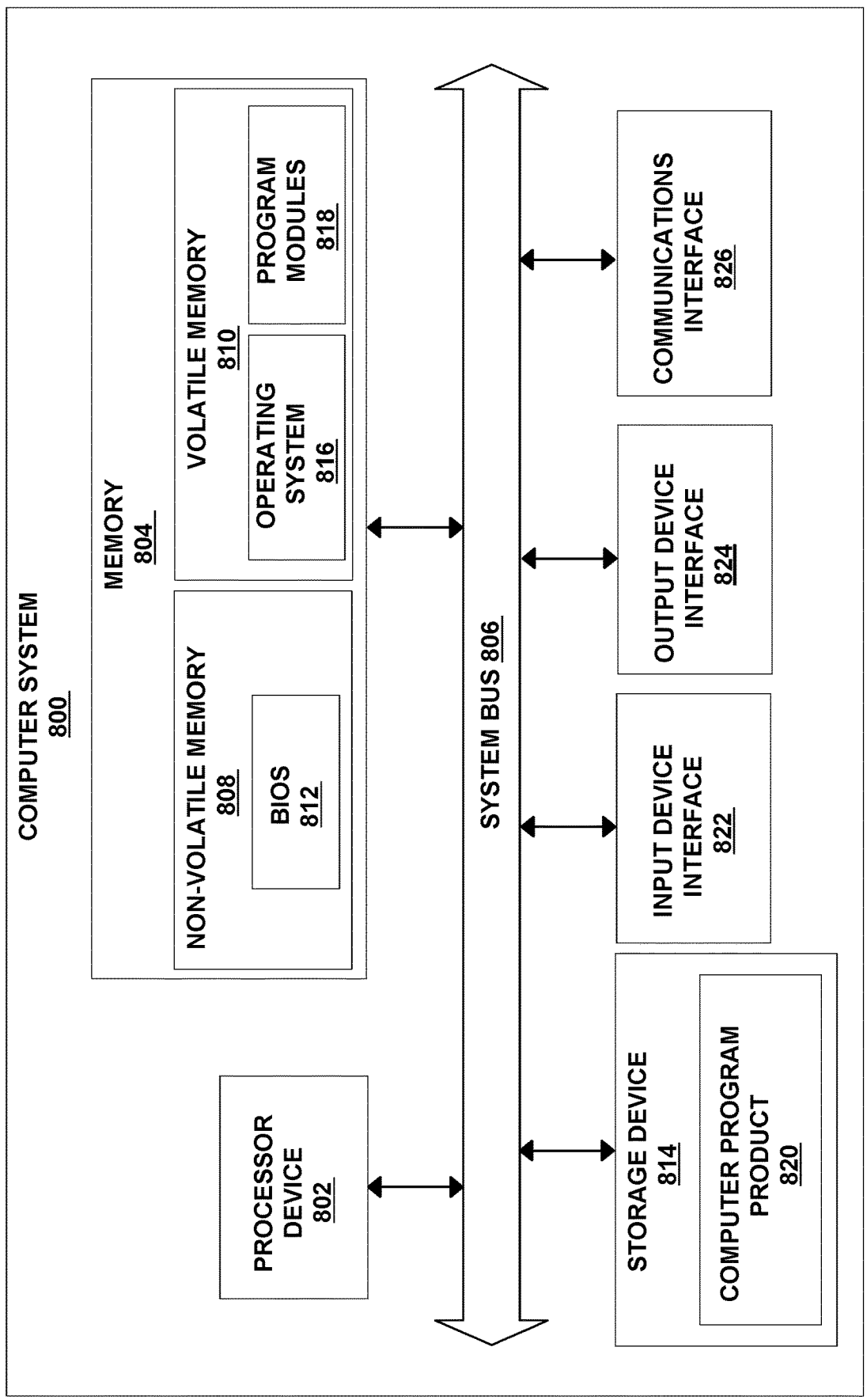
FIG. 8 is an exemplary computer system, according to one example.

FIG. 8 is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, ethernet etc.

The computer system 800 may comprise at least one computing device or electronic device capable of including firmware, hardware, and/or executing software instructions to implement the functionality described herein. The computer system 800 may include processing circuitry 802 (e.g., processing circuitry including one or more processor devices or control units), a memory 804, and a system bus 806. The computer system 800 may include at least one computing device having the processing circuitry 802. The system bus 806 provides an interface for system components including, but not limited to, the memory 804 and the processing circuitry 802. The processing circuitry 802 may include any number of hardware components for conducting data or signal processing or for executing computer code stored in memory 804. The processing circuitry 802 (e.g., of a control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 802 may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processing circuitry 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with processing circuitry 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 814 and/or in the volatile memory 810, which may include an operating system 816 and/or one or more program modules 818. All or a portion of the examples disclosed herein may be implemented as a computer program 820 stored on a transitory or non-transitory computer-usable or computer-readable storage medium (e.g., single medium or multiple media), such as the storage device 814, which includes complex programming instructions (e.g., complex computer-readable program code) to cause the processing circuitry 802 to carry out actions described herein. Thus, the computer-readable program code of the computer program 820 can comprise software instructions for implementing the functionality of the examples described herein when executed by the processing circuitry 802. In certain examples, the storage device 814 may be a computer program product (e.g., readable storage medium) storing the computer program 820 thereon, where at least a portion of a computer program 820 may be loadable (e.g., into a processor) for implementing the functionality of the examples described herein when executed by the processing circuitry 802. The processing circuitry 802 may serve as a controller or control system for the computer system 800 that is to implement the functionality described herein.

The computer system 800 may include an input device interface 822 configured to receive input and selections to be communicated to the computer system 800 when executing instructions, such as from a keyboard, mouse, touch-sensitive surface, etc. Such input devices may be connected to the processing circuitry 802 through the input device interface 822 coupled to the system bus 806 but can be connected through other interfaces, such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may include a communications interface 826 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Further aspects of the present disclosure are provided by the subject matter of the following examples.

Example 1: A method, comprising: decompressing, via at least one processor of a computer system, a compressed videostream comprising a compressed graphical timestamp, thereby resulting in a decompressed videostream comprising a decompressed graphical timestamp, the compressed graphical timestamp and the decompressed graphical timestamp associated with an insert time; rendering, via the at least one processor, the decompressed videostream, resulting in a rendered videostream comprising a rendered graphical timestamp; extracting, via the at least one processor, the rendered graphical timestamp from the rendered videostream at an extract time; and determining, via the at least one processor, whether a difference between the insert time of the rendered graphical timestamp and the extract time exceeds a predetermined threshold.

Example 2: The method of any preceding example, wherein the compressed graphical timestamp is sequential and incremental.

Example 3: The method of any preceding example, wherein the compressed graphical timestamp is a bitmap inserted into a videostream prior to compression of the videostream.

Example 4: The method of any preceding example, further comprising: when the predetermined threshold is exceeded, blacking out a display receiving the rendered videostream.

Example 5: The method of any preceding example, further comprising: wherein the rendered graphical timestamp is a bitmap.

Example 6: The method of any preceding example, wherein the compressed graphical timestamp is a bitmap inserted into the compressed videostream after the compressed videostream was already compressed.

Example 7: The method of any preceding example, further comprising: receiving, at the computer system, a first compressed videostream; upon receiving the first compressed videostream, generating, via the at least one processor, the bitmap; compressing, via the at least one processor, the at least one processor, the bitmap, resulting in the compressed graphical timestamp; and adding, via the at least one processor, the compressed graphical timestamp to the first compressed videostream, resulting in the compressed videostream.

Example 8: The method of any preceding example, wherein the insert time comprises a predetermined cycle time between non-compressed timestamps.

Example 9: The method of any preceding example, wherein the insert time comprises a relative time of non-compressed timestamps.

Example 10: The method of any preceding example, further comprising: inserting, via the at least one processor, a graphical timestamp into an original videostream, resulting in a modified videostream; and compressing the modified videostream, resulting in the compressed videostream.

Example 11: The method of any preceding example, further comprising:
receiving, at the computing system, the compressed videostream including the compressed graphical timestamp.

Example 12: The method of any preceding example, further comprising:
receiving, at the computing system from a camera, the compressed videostream and a metadata timestamp, the metadata timestamp identifying the insert time, wherein the determining further comprises a comparison of the metadata timestamp to the extract time.

Example 13: A vehicle comprising a computing device configured to perform the method of any preceding example.

Example 14: The method of any preceding example, wherein the rendered graphical timestamp comprises multiple segments.

Example 15: The method of any preceding example, further comprising:
receiving, in a common data stream with the compressed videostream, a metadata timestamp, wherein the determining whether the difference between the insert time rendered graphical timestamp and the extract time exceeds the predetermined threshold comprises comparing the metadata timestamp to the insert time of the rendered graphical timestamp.

Example 16: The method of any preceding example, further comprising:
determining the insert time of the rendered graphical timestamp by knowing a priori what finite set of valid graphical timestamp exist and thereby what graphical timestamp corresponds to a particular insert time stamp.

Example 17: The method of any preceding example, further comprising:
determining that the rendered graphical timestamp is not a valid graphical timestamp, such that a corrupt videostream exists.

Example 18: The method of any preceding example, further comprising: blacking out a display receiving the rendered videostream when the corrupt videostream is detected.

Example 19: The method of any preceding example, further comprising:
determining the insert time of the rendered graphical timestamp using a lookup table.

Example 20: The method of any preceding example, further comprising:
determining the insert time of the rendered graphical timestamp by generating a signature representing the rendered graphical timestamp, the signature known a priori, thereby what finite set of valid signatures exist and thereby what signatures correspond to a certain insert time stamp.

Example 21: The method of any preceding example, wherein the signature is a CRC (Cyclic Redundancy Check) of the rendered graphical timestamp.

Example 22: A computer system, comprising: at least one processor; and a non-transitory computer-readable storage medium having instructions stored which, when executed by the at least one processor, cause the at least one processor to perform operations comprising: decompressing a compressed videostream comprising a compressed graphical timestamp, thereby resulting in a decompressed videostream comprising a decompressed graphical timestamp, the compressed graphical timestamp and the decompressed graphical timestamp associated with an insert time; rendering the decompressed videostream, resulting in a rendered videostream comprising a rendered graphical timestamp; extracting the rendered graphical timestamp from the rendered videostream at an extract time; and determining whether a difference between the insert time of the rendered graphical timestamp and the extract time exceeds a predetermined threshold.

Example 23: The computer system of any preceding example, wherein the compressed graphical timestamp is sequential and incremental.

Example 24: The computer system of any preceding example, wherein the compressed graphical timestamp is a graphic inserted into a videostream prior to compression.

Example 25: The computer system of any preceding example, further comprising:
a display receiving and displaying the rendered videostream.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method, comprising:
   decompressing, via at least one processor of a computer system, a compressed videostream comprising a compressed graphical timestamp, thereby resulting in a decompressed videostream comprising a decompressed graphical timestamp, the compressed graphical timestamp and the decompressed graphical timestamp associated with an insert time;
   rendering, via the at least one processor, the decompressed videostream, resulting in a rendered videostream comprising a rendered graphical timestamp;
   extracting, via the at least one processor, the rendered graphical timestamp from the rendered videostream at an extract time;
   determining the insert time of the rendered graphical timestamp using a lookup table; and
   determining, via the at least one processor, whether a difference between the insert time of the rendered graphical timestamp and the extract time exceeds a predetermined threshold.

2. The method of claim 1, wherein the compressed graphical timestamp is sequential and incremental.

3. The method of claim 1, wherein the compressed graphical timestamp is a bitmap inserted into a videostream prior to compression of the videostream.

4. The method of claim 1, further comprising:
   when the predetermined threshold is exceeded, blacking out a display receiving the rendered videostream.

5. The method of claim 1, further comprising:
   wherein the rendered graphical timestamp is a bitmap.

6. The method of claim 1, wherein the compressed graphical timestamp is a bitmap inserted into the compressed videostream after the compressed videostream was already compressed.

7. The method of claim 6, further comprising:
   receiving, at the computer system, a first compressed videostream;
   upon receiving the first compressed videostream, generating, via the at least one processor, the bitmap;
   compressing, via the at least one processor, the bitmap, resulting in the compressed graphical timestamp; and
   adding, via the at least one processor, the compressed graphical timestamp to the first compressed videostream, resulting in the compressed videostream.

8. The method of claim 1, wherein the insert time comprises a predetermined cycle time between non-compressed timestamps.

9. The method of claim 1, wherein the insert time comprises a relative time of non-compressed timestamps.

10. The method of claim 1, further comprising:
    inserting, via the at least one processor, a graphical timestamp into an original videostream, resulting in a modified videostream; and
    compressing the modified videostream, resulting in the compressed videostream.

11. The method of claim 1, further comprising:
    receiving, at the computing system, the compressed videostream including the compressed graphical timestamp.

12. The method of claim 1, further comprising:
    receiving, at the computing system from a camera, the compressed videostream and a metadata timestamp, the metadata timestamp identifying the insert time,
    wherein the determining further comprises a comparison of the metadata timestamp to the extract time.

13. A vehicle comprising a computing device configured to perform the method of claim 1.

14. The method of claim 1, wherein the rendered graphical timestamp comprises multiple segments.

15. The method of claim 1, further comprising:
    receiving, in a common data stream with the compressed videostream, a metadata timestamp, wherein the determining whether the difference between the insert time rendered graphical timestamp and the extract time exceeds the predetermined threshold comprises comparing the metadata timestamp to the insert time of the rendered graphical timestamp.

16. The method of claim 11, further comprising:
    determining the insert time of the rendered graphical timestamp by knowing a priori what finite set of valid graphical timestamp exist and thereby what graphical timestamp corresponds to a particular insert time stamp.

17. The method of claim 16, further comprising:
    determining that the rendered graphical timestamp is not a valid graphical timestamp, such that a corrupt videostream exists.

18. The method of claim 17, further comprising:
blacking out a display receiving the rendered videostream when the corrupt videostream is detected.

19. The method of claim 1, further comprising:
determining the insert time of the rendered graphical timestamp by generating a signature representing the rendered graphical timestamp, the signature known a priori, thereby what finite set of valid signatures exist and thereby what signatures correspond to a certain insert time stamp.

20. The method of claim 19, wherein the signature is a CRC (Cyclic Redundancy Check) of the rendered graphical timestamp.

21. A computer system, comprising:
at least one processor; and
a non-transitory computer-readable storage medium having instructions stored which, when executed by the at least one processor, cause the at least one processor to perform operations comprising:
decompressing a compressed videostream comprising a compressed graphical timestamp, thereby resulting in a decompressed videostream comprising a decompressed graphical timestamp, the compressed graphical timestamp and the decompressed graphical timestamp associated with an insert time;
rendering the decompressed videostream, resulting in a rendered videostream comprising a rendered graphical timestamp;
extracting the rendered graphical timestamp from the rendered videostream at an extract time;
determining the insert time of the rendered graphical timestamp using a lookup table; and
determining whether a difference between the insert time of the rendered graphical timestamp and the extract time exceeds a predetermined threshold.

22. The computer system of claim 21, wherein the compressed graphical timestamp is sequential and incremental.

23. The computer system of claim 21, wherein the compressed graphical timestamp is a graphic inserted into a videostream prior to compression.

24. The computer system of claim 21, further comprising:
a display receiving and displaying the rendered videostream.

* * * * *